United States Patent [19]

Jewell

[11] Patent Number: 4,573,767
[45] Date of Patent: Mar. 4, 1986

[54] OPTICAL FLIP-FLOP SYSTEM

[75] Inventor: Jack L. Jewell, Tucson, Ariz.

[73] Assignee: The United States of America as represented by the Secretary of the Air Force, Washington, D.C.

[21] Appl. No.: 615,612

[22] Filed: May 31, 1984

[51] Int. Cl.$^4$ .............................................. G02F 1/21
[52] U.S. Cl. .................................................... 350/354
[58] Field of Search ........................................ 350/354

[56] References Cited

U.S. PATENT DOCUMENTS

| | | | |
|---|---|---|---|
| 3,239,688 | 3/1966 | Price | 307/88.5 |
| 3,483,529 | 12/1969 | Fenner | 340/173 |
| 3,813,605 | 5/1974 | Szoke | 330/4.3 |
| 3,941,455 | 3/1976 | O'Brien | 350/160 LC |

OTHER PUBLICATIONS

Abraham et al., "The Optical Computer" *Scientific American*, Feb. 1983, pp. 85-93.
Gibbs, H. M. et al., "Optical Bistability in Semiconductors," *Appl. Phys. Lett.*, 35 (6), Sep. 15, 1979, pp. 451-453.
Tarng, S. S. et al., "External Off and On Switching of a Bistable Optical Device," *Appl. Phys. Lett.*, 40 (3), Feb. 1, 1982, pp. 205-207.
Miller, D. A. B., et al., "Large Room-Temperature Optical Nonlinearity in GaAs/Ga$_{1-x}$ Al$_x$As Multiple Quantum Well Structures," *Appl. Phys. Lett.*, 41 (8), Oct. 15, 1982, pp. 679-681.
Gibbs, H. M., "Optical Modulation by Optical Tuning of a Cavity," *Appl. Phys. Lett.*, 34 (8), Apr. 15, 1979, pp. 511-514.
Gibbs, H. M. et al., "Optical Bistability," *Optical Society of America*, 1979.
Jewell, J. L. et al., "Fabrication of GaAs Bistable Optical Devices," *Materials Letters*, vol. 1, No. 5, Apr. 6, 1983, pp. 148-151.

*Primary Examiner*—Bruce Y. Arnold
*Attorney, Agent, or Firm*—Donald J. Singer; Jacob N. Erlich

[57] ABSTRACT

An optical flip-flop system having a pair of optically aligned nonlinear Fabry-Perot etalons, one of which acting as a bistable optical device, the other acting as a negative optical gate. The negative optical gate is initially tuned for high transmission and will remain transmissive until impinged upon by a first optical pulse, at which time it will momentarily become nontransmissive. If this nontransmissive state is longer than the recovery time of the bistable optical device, then the bistable optical device will become nontransmissive. The bistable optical device will remain nontransmissive until impinged upon by a second optical pulse. Thereupon, the bistable optical device will remain transmissive until such time the negative optical gate becomes nontransmissive again. In this manner the flip-flop system can be readily controlled by the application of the pair of optical pulses thereto.

10 Claims, 4 Drawing Figures

OPTICAL FLIP-FLOP SYSTEM

STATEMENT OF GOVERNMENT INTEREST

The invention described herein may be manufactured and used by or for the Government for governmental purposes without the payment of any royalty thereon.

BACKGROUND OF THE INVENTION

This invention relates generally to optical bistable devices, and, more particularly, to an optical flip-flop system.

Recently much attention has been directed to transmission of speech, data, pictures, or other information by light. More commonly, this type of transmission by optical means is referred to as an optical communication system which is generally characterized as being either radio optical communications, in which the light signals radiate through open space or atmosphere; or guided optical communications, in which the electromagnetic waves constituting the light are guided or regularly refocused along a confined path or optical transmission line. There are numerous advantages in the utilization of light waves instead of radio waves for communication in that the information-carrying capacity of the light waves is substantially greater than that of radio waves and the light radiation can be concentrated into narrower beams or confined in smaller waveguides as a result of the inherent shorter wavelength of the radiation.

It has recently been demonstrated through the transmission of 1.32 $\mu$m, 5-psec pulses through a 1 km optical fiber that such transmission can be provided without significant dispersional distortion using short optical pulses and optical fibers. Since such propagating optical signals are not easily influenced by external electromagnetic fields, the utilization of optical communication systems are becomming even more attractive and their potential use in the future appears great. Generally in such optical communication systems, only the transmission of the signals has been optical and the regeneration, modulation, amplification, etc. were performed electrically. It is quite possible, however, that an all optical system would produce substantially better results since it would be substantially simpler, efficient and provide higher speed information processing.

Optical bistability, that is, a new phenomenon of current interest, provides for two different steady-state transmission and or reflection states for the same input intensity. In this new phenomenon, matter and light are closely coupled together and involve phase transitions far from thermal equilibrium. Consequently bistable devices have potential applications as a practical active component for integrated optical circuitry. Therefore, such optical bistable devices are being explored as basic components in all optical signal processing, communication and computing systems.

It has been recognized that intrinsic optical bistable devices have the capability of being switched on with external pulses. However, the switch-off capability generally requires a reduction of the input intensity below the switch-on intensity. Two examples of bistable optical devices which have been used in the past can be found in U.S. Pat. No. 3,813,605, issued on May 28, 1974 to Abraham Szoke and U.S. Pat. No. 3,941,455 issued on Mar. 2, 1976 to John O'Brien. U.S. Pat. No. 3,813,605 relies upon an inconvenient optically controlled switch-off capability, and U.S. Pat. No. 3,941,455 has no optical switch-off capability.

It appears that the first switch-off of an intrinsic optical bistable device by an external optical pulse was reported in an article by S. S. Tarng et al (in which this inventor is one of the co-authors) entitled "External Off and On Switching of a Bistable Optical Device," *Applied Physics Letters*, 40(3), Feb. 1, 1982, pages 205–207. The above-mentioned article describes a brute force technique in which enough energy is absorbed to heat the device thereby changing the characteristic curves so that the switch-off intensity is above the constant input intensity, resulting in excitonic switch-off. The mechanism is thus the same as for the self-switching of an unstable device undergoing regenerative pulsations. Although such an attempt in switch-off capability is operational it is unlikely to be practical. However, such an attempt appears to be the first step towards active switch-off capability of bistable devices It would, therefore, be highly desireable if it were possible to provide a bistable optical system (i.e. an optical flip-flop device) in which the source for the incoming beam remains unaffected and yet provides a reliable, extremely fast on-off capability.

SUMMARY OF THE INVENTION

The present invention overcomes the problems encountered in the past and as set forth in detail hereinabove by providing an optical flip-flop system which incorporates therein the use of a pair of optically aligned Fabry-Perot etalons acting as a bistable device and a negative optical gate, respectively.

The optical flip-flip system of the present invention includes the use of two nonlinear Fabry-Perot etalons in optical alignment with each other and in optical alignment with a constant intensity electromagnetic input beam (light source) for transmitting communication data. One of the Fabry-Perot etalons acts as a bistable optical device (BOD) while the other Fabry-Perot etalon acts as a negative optical gate (NOG).

The two etalon system of the present invention has the capability of providing for a switch-off capability in which an optical switch-off pulse causes a momentary drop in the input intensity of the bistable optical device without affecting the source.

The switch-off pulse is incident upon the Fabry-Perot etalon acting as a negative optical gate which has initially been tuned for maximum transmission of the input beam. The switch-off pulse changes the refractive index of the negative optical gate thereby shifting the transmission peak away from the wavelength of the source (for example, in the form of a dye laser). In other words, the negative optical gate (NOG) causes an optical inversion to take place since the incident pulse causes a "negative pulse" in the transmitted signal. This momentary drop in intensity is of sufficient depth and duration to switch the Fabry-Perot etalon acting as a bistable optical device off. Consequently, what is created is an optical flip-flop which is switched "on" by an optical pulse incident upon the bistable optical device and switched "off" by a similar type pulse on the negative optical gate.

For the most efficient operation of the negative optical gate, the nonlinear material or medium utilized therein should be nearly transparent to the wavelength of the input beam, therefore allowing high transmission and insensitivity to the beam intensity. Further the finesse can also be increased, thereby reducing the required refractive index change for effective operation. The switch-off pulse, on the other hand, should be at a wavelength at which the material is more absorbing.

The type of optical flip-flop system described by this invention achieves an all optical operation using two independently controlled nonlinear Fabry-Perot etalons. The same nonlinearity yields switch-off as well as switch-on capability allowing one to make full use of any particularly desirable nonlinearity. The optical flip-flop system of the present invention does not require critical spacing between the etalons (as long as this spacing is larger than the coherent length of the input light) and the switch-on and switch-off pulses can emanate from an identical source. Consequently, the two etalons do not need a large space separation therebetween and the system remains insensitive to changes of less than one wavelength. Stated more succinctly, in the optical flip-flop system of the present invention the bistable optical device is considered the switch and the negative optical gate is considered an effective means of turning the switch off without adversely affecting the source of input electromagnetic radiation (light).

Since the negative optical gate momentarily prevents light from reaching the bistable optical device the medium inside the bistable optical device will recover in a short period of time. Since both switch-on and switch-off capability are accomplished by exitation of the medium, the rise and fall times can be very fast. Thus, the optical flip-flop system of this invention can also be used to generate short rectangular-shaped pulses.

It is therefore an object of this invention to provide an all optical flip-flop system.

It is another object of this invention to provide an optical flip-flop system which has extremely quick response time and is highly reliable in operation.

It is still another object of this invention to provide an optical flip-flop system which incorporates therein a pair of nonlinear Fabry-Perot etalons.

It is a further object of this invention to provide an optical flip-flop system which can be made in a compact configuration and which is insensitive to the length or spacing between the etalons utilized as components thereof.

It is still a further object of this invention to provide an optical flip-flop system which is economical to produce and which utilizes conventional, currently available components that lend themselves to standard mass producing manufacturing techniques.

For a better understanding of the present invention, together with other and further objects thereof, reference is made to the following description taken in conjunction with the accompanying drawings and its scope will be pointed out in the appended claims.

DETAILED DESCRIPTION OF THE PREFERRED EMBODIMENT

Figure 1:
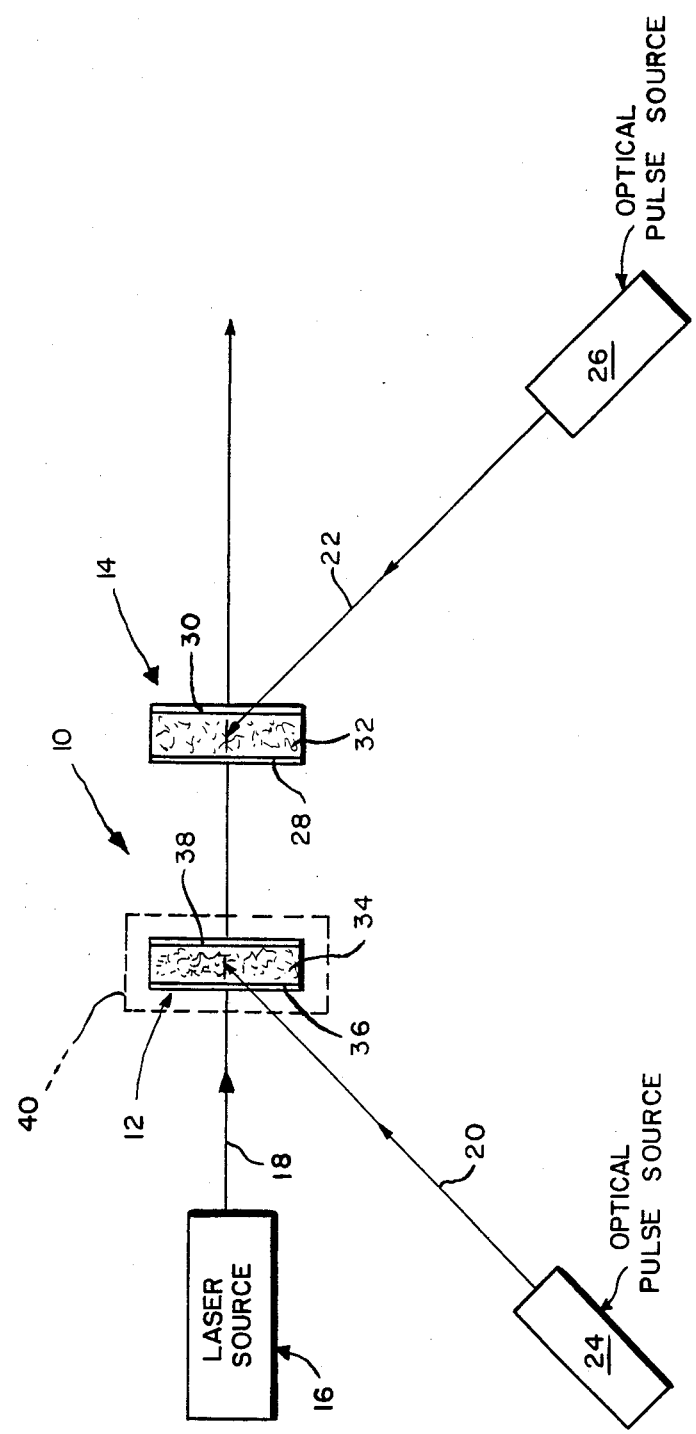
FIG. 1 is a schematic representation of the optical flip-flop system of this invention.

Reference is now made to FIG. 1 of the drawings which schematically illustrates the optical flip-flop system 10 of the present invention. Optical flip-flop system 10 is made up of the following components: a pair of optically aligned nonlinear Fabry-Perot etalons 12 and 14 which will be described in greater detail hereinbelow; an optical source 16, for example, in the form of a dye laser which is capable of emitting a beam of electromagnetic radiation 18 of, for example, 8500 Å and having an intensity of approximately 50 mW; and a pair of optical pulse signals 20 and 22 provided by any suitable optical pulse source such as a pulsed laser or lasers 24 and 26. It is these pulse signals 20 and 22 which initiate the on and off capability of the optical flip-flop system 10 of this invention.

Figure 2:
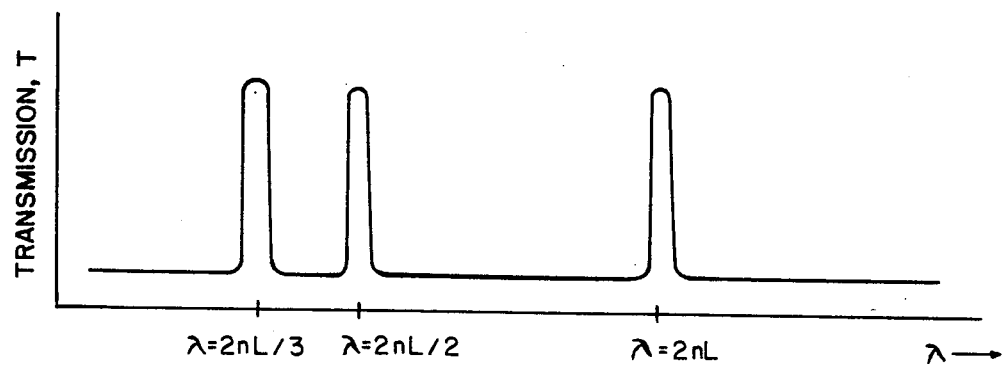
FIG. 2 is a graphic representation of transmission versus wavelength in a Fabry-Perot cavity of the type utilized within the optical flip-flop system of this invention.
Figure 3:
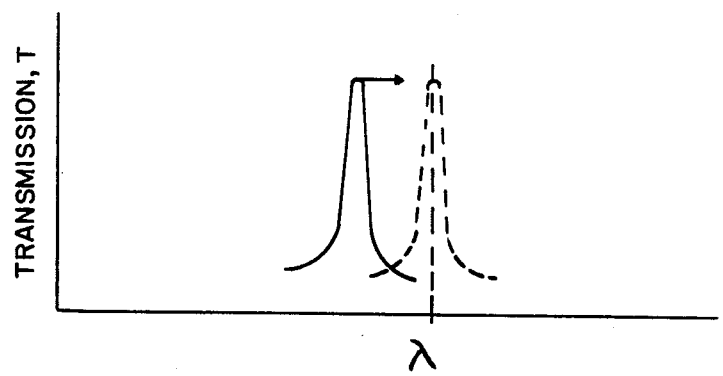
FIG. 3 is a graphic representation showing the transmission peaks of a Fabry-Perot cavity of the type utilized within the optical flip-flop of this invention.

For a complete understanding of the optical flip-flop system 10 of the present invention, it is first necessary to better understand the makeup and operation of the nonlinear Fabry Perot etalons 12 and 14 utilized within the system of this invention. The following description is therefore provided. As stated hereinabove, the nonlinear Fabry-Perot etalons 12 and 14 are optically aligned with one another, with one of the Fabry-Perot etalons 14 acting as a bistable optical device (BOD) and the other Fabry-Perot etalon acting as a negative optical gate (NOG). Since the differences between the negative optical gate 12 and the bistable optical device 14 reside mainly in their capability to transmit or absorb different wavelengths of light and their reaction to different input pulses, the basic physical makeup of etalons 12 and 14 is described hereinbelow in conjunction with etalon 14 which acts as a bistable optical device The bistable optical device is an optical element that possesses two different steady-state transmission states for the same input intensity. The nonlinear Fabry-Perot etalon is made up of a pair of juxtaposed reflective surfaces in the form of mirrors 28 and 30 having sandwiched therebetween a medium 32 capable of having its index of refraction shifted by changes in either temperature or light intensity. An example of such an appropriate medium would be a thin layer of GaAs or AlGaAs. The exact fabrication process may vary and an example of one such fabrication process is described in the publication by J. L. Jewell et al entitled "Fabrication of GaAs Bistable Optical Devices," *Materials Letters*, Volume 1, No. 5, Apr. 6, 1983, pages 148 through 151 and which is incorporated herein by reference More specifically, the Fabry-Perot cavity is bounded by the pair of mirrors 28 and 30 and has a high transmission, T, at wavelength $\lambda_m$ such that $m\lambda_m = 2nL$ where m = an integer, n = the refractive index of the medium 32 between the pair of mirrors 28 and 30 and L = the distance between mirrors 28 and 30. The relationship between the transmission, T, and the wavelength, $\lambda$, is illustrated graphically in FIG. 2 of the drawings. If the cavity length or the distance, L, between mirrors 28 and 30 changes or the refractive index of the medium 32 between the mirrors 28 and 30 changes, the wavelength of high transmission will also change. This is illustrated in FIG. 3 of the drawings in which the peaks of the transmissive wavelengths is shown in two positions.

During its operation within flip-flop system 10, bistable optical device 14 has its medium 32 absorbing some of the incident radiation thereupon. This absorbtion causes a change in the refractive index of medium 32 and thus shifts the transmission peak as pointed out hereinabove and as illustrated by the dotted representation in FIG. 3 of the drawings. When the bistable optical device 14 is utilized with the laser source 16 of the present invention, it is operational in two states, that is, one in which the beam 18 is allowed to pass through bistable device 14 and the other in which it is incapable of being passed therethrough.

Stated more succinctly, in its initial state, bistable optical device 14 is fabricated such that it is initially nontransmitting at the wavelength of interest, that is, the wavelength of the incoming light beam 18. Furthermore, the intensity of input beam 18 is such that it is insufficient to change the refractive index of medium 32 utilized within bistable optical device 14. Such a preferred intensity could be 50 mW, for example. In order to turn "on" the bistable optical device 14 an additional pulse of electromagnetic radiation (light) 22 at approximately the same wavelength as input beam 18 is required. A wavelength of 8000 Å, for example, would be acceptable. This optical pulse 22 emanates from a laser source 26, having an intensity (approximately 15 mW, for example) which when combined with the intensity of beam 18 is sufficient to change the refractive index of medium 32 and therefore allow bistable optical device 14 to transmit the electromagnetic (light) beam 18 therethrough. When the Fabry-Perot cavity or bistable optical device 14 is in its transmitting state, the intensity inside the cavity is usually much higher than the incident intensity. Consequently, even with the removal of the optical pulse 22 there is sufficient intensity to maintain medium 32 transmissive to the beam 18. Bistable device 14 will now continue to transmit until something upsets this state of equilibrium.

As pointed out in the background of this invention there is no simple way of changing the transmission state of the bistable optical device 14 so as to permit a flip-flop operation of the type required by the present invention. The present invention overcomes this problem by including in optical alignment with bistable optical device 14 and interposed between the laser source 16 and the bistable optical device 14 the other nonlinear Fabry-Perot etalon 12, which in this instance, functions as a negative optical gate (NOG).

The nonlinear Fabry-Perot etalon or negative optical gate 12 is fabricated substantially identical to the bistable optical device 14 except that the medium 34 situated between the reflective mirrors 36 and 38 and the length, L, between the mirrors 36 and 38 are such that etalon 12 transmits light at the wavelength of the input beam 18. One method of accomplishing this transmissivity may be by altering the temperature of the medium 34 and this can be accomplished by including or incorporating within the system a conventional temperature controlling unit 40, illustrated by the dotted lines around the Fabry-Perot etalon 12 in FIG. 1 of the drawings.

Consequently, in operation, the beam of electromagnetic radiation (light) 18 proceeds to pass through the negative optical gate 12 as well as through the bistable optical device 14 as long as the bistable optical device 14 is also in its transmissive state by the application of a switch-on optical pulse 22 thereto.

In order to prevent light beam 18 from outputting the system 10, a second optical pulse 20 from either an additional optical pulse source, for example, a pulsed laser 24 or from the same optical pulse source 26 as utilized for beam 22 would be required. This second pulse 20 impinges upon medium 34 of negative optical gate 12 and therefore momentarily alters its index of refraction. This change in index of refraction temporarily blocks the incident beam of radiation (light) 18 from passing therethrough by changing the transmissivity of Fabry-Perot etalon or negative optical gate 12. In so doing, the electromagnetic beam or light beam 18 which was incident on bistable optical device 14 is now momentarily interrupted causing the intensity within the bistable optical device 14 to fall below what is necessary for this device to remain transmissive. And, consequently, even though the negative optical gate 12 returns to its transmissive state upon the removal of optical pulse 20, the bistable optical device 14 remains nontransmissive and will not allow beam 18 to pass therethrough until another switch-on pulse 22, impinges thereupon. Pulse 22 reverts bistable device 14 back to its transmissive state. In this manner, it is extremely simple to create a pulsing device (flip-flop) which is easily controllable and quick acting by the application of any of a plurality of pulse signals such as illustrated by pulses 20 and 22.

Summarizing the above described operation of the optical flip-flop system 10 of the present invention, the negative optical gate 12 is initially tuned for high transmission and will transmit input beam 18 until it is "hit" by optical pulse 20, similar to the switch-on pulse 22 for bistable optical device 14. Once impinged upon by pulse 20, negative optical gate 12 has its transmission peak moved from the laser wavelength of input beam 18 until the medium 34 between mirrors 36 and 38 recovers. If this "off" time is longer than the recovery time for the medium 32 of bistable optical device 14, then the bistable optical device 14 will have switched-off and can be switched-on any time after the medium 34 of negative optical gate 12 has recovered. Thus, utilizing two Fabry-Perot etalons (bistable optical device 14 and negative optical gate 12) together in an optical system enables the system to function as an effective optical flip-flop.

Figure 4:
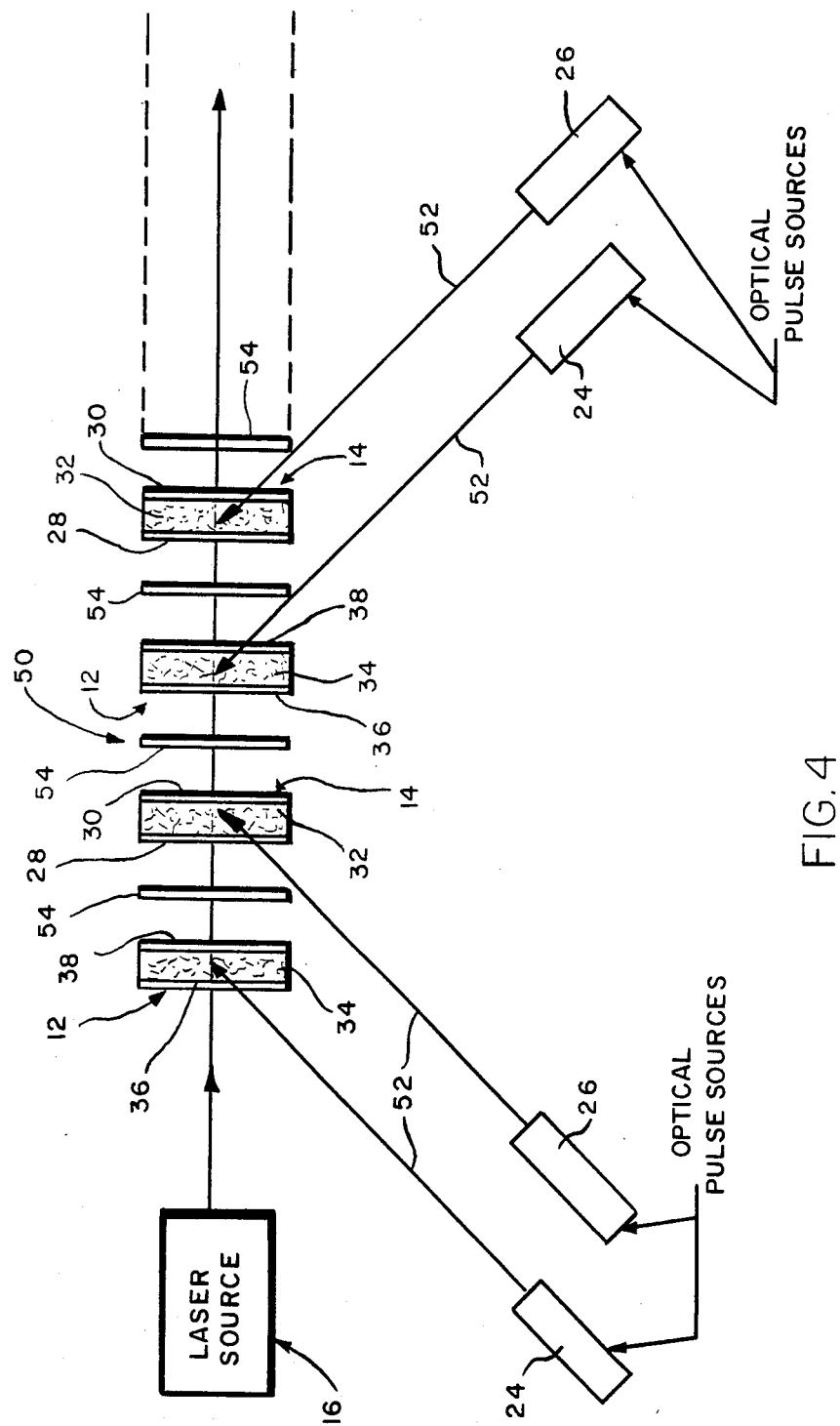
FIG. 4 is a schematic representation of a modified version of the optical flip-flop system of this invention.

In addition to the optical flip-flop system 10 of the present invention described hereinabove with reference to FIG. 1 of the drawings it is also possible with the type of flip-flop system of the present invention to optically cascade a plurality of negative optical gates 12 and bistable optical devices 14 in alternate fashion in order to produce a serial flip-flop system. Such an optical serial flip-flop system 50 is illustrated in FIG. 4 of the drawings. Since the major components of serial flip-flop system 50 are identical to those described with reference to flip-flop system 10, those identical components have been represented by the same reference numerals in both FIGS. 1 and 4 of the drawings. With such an optical configuration it is possible to regulate the output from flip-flop system 50 by controlling one or more of a series of different optical pulses 52. For additional optical stability within system 50 a plurality of focusing elements 54 can be interposed between negative optical gates 12 and bistable optical devices 14, respectively. These focusing elements 54 may contain a matrix of $1000 \times 1000$ lenses or waveguides to form what may be referred to as a waveguide array (WGA), that is, basically an array of tiny lenses to continually focus the beam of radiation passing through the plurality of Fabry-Perot etalons.

Although this invention has been described with reference to particular embodiments, it will be understood that this invention is also capable of further and other embodiments within the spirit and scope of the appended claims.

I claim:

1. An optical flip-flop system comprising:
   first means in the form of a nonlinear Fabry-Perot etalon for receiving a beam of electromagnetic radiation at a preselected wavelength and for transmitting said beam therethrough when said first means is in a transmissive state and for preventing said beam from passing therethrough upon the application of a first signal thereto which changes said first means to a nontransmissive state; and
   second means in the form of a nonlinear Fabry-Perot etalon being initially in a nontransmissive state and optically aligned with said first means for receiving said beam of electromagnetic radiation from said first means and for transmitting said beam therethrough upon the application of a second signal thereto which causes said second means to be in a transmissive state, and for preventing said beam from passing therethrough when said first means is in the nontransmissive state, said nontransmissive state of said first means causing said second means to change back to said nontransmissive state; and
   whereby said transmissive or nontransmissive states of said flip-flop system are controlled by said signals applied to said first and second means.

2. An optical flip-flop system as defined in claim 1 wherein said beam of electromagnetic radiation is at a preselected intensity and said second signal received by said second means is at a lesser preselected intensity, wherein said second means is incapable of changing to said transmissive state upon the receiving of only said beam and is capable of changing to said transmissive state upon receiving both said beam and said second signal and remaining in said transmissive state even upon the removal of said second signal therefrom.

3. An optical flip-flop system as defined in claim 2 wherein said first means changes to said nontransmissive state when said first signal is received thereby.

4. An optical flip-flop system as defined in claim 3 wherein said beam of electromagnetic radiation is in the form of a light beam and said first and second signals are in the form of optical pulses.

5. An optical flip-flop system as defined in claim 4 wherein said light beam is provided by a laser source.

6. An optical flip-flop system as defined in claim 5 wherein said optical pulses are provided by at least one laser source.

7. An optical flip-flop system as defined in claim 4 wherein each of said Fabry-Perot etalons comprises a pair of reflective elements having sandwiched therebetween a medium capable of having its index of refraction shifted.

8. An optical flip-flop system as defined in claims 7 wherein said medium is a thin layer of GaAs.

9. An optical flip-flop system as defined in claim 8 wherein said light beam is provided by a laser source.

10. An optical flip-flop system as defined in claim 9 wherein said optical pulses are provided by at least one laser source.

* * * * *